United States Patent [19]
Ota et al.

[11] Patent Number: 5,228,797
[45] Date of Patent: Jul. 20, 1993

[54] CONNECTING PIN DEVICE FOR WORKING MACHINE OPERATING LINKS

[75] Inventors: Akio Ota, Komatsu; Sinji Takeuchi, Ishikawa, both of Japan

[73] Assignee: Kabushiki Kaisha Komatsu Seisakusho, Tokyo, Japan

[21] Appl. No.: 741,456

[22] PCT Filed: Feb. 2, 1990

[86] PCT No.: PCT/JP90/00133

§ 371 Date: Aug. 6, 1991

§ 102(e) Date: Aug. 6, 1991

[87] PCT Pub. No.: WO90/09490

PCT Pub. Date: Aug. 23, 1990

[30] Foreign Application Priority Data

Feb. 10, 1989 [JP] Japan .................. 1-15022

[51] Int. Cl.⁵ .................................. F16B 1/00
[52] U.S. Cl. .......................... 403/147; 403/146; 403/119
[58] Field of Search ............ 403/147, 146, 149, 145, 403/162, 161, 326, 374

[56] References Cited

U.S. PATENT DOCUMENTS 2,716,033  8/1955  Dodge ........................ 403/146
4,077,232  3/1978  Grosseau ................. 403/326 X
4,225,263  9/1980  Asberg ...................... 403/326

FOREIGN PATENT DOCUMENTS

2327566  1/1974  Fed. Rep. of Germany ...... 403/326
10766   2/1983  Japan .
52315   4/1983  Japan .
97619   6/1986  Japan .
54319   4/1987  Japan .

*Primary Examiner*—Randolph A. Reese
*Assistant Examiner*—Anthony Knight
*Attorney, Agent, or Firm*—Richards, Medlock & Andrews

[57] ABSTRACT

The present invention aims to minimize the axial and radial clearance or play suppress a radial inertial movement in the pin joint connection portions of a machine operating link device. To achieve this, the present invention provides a joint connecting pin device for machine operating links adapted to change and retain the posture of the working unit of a hydraulic excavator or the like, the device comprising: thrust distributing and forming portions which are provided between end surfaces of pin boss portions on links on one side connected to a pin and opposed end surfaces of a link on the other side and which are adapted to distribute a thrust in the axial and radial directions; rigid-elastic annular members which are held by the thrust distributing and forming portions; and an axial movement device which is provided on at least one of the pin boss sections and which is adapted to impart a radial resilient force to the rigid-elastic annular members. In the above structure, the thrust distributing and forming portions may consist of beveled surfaces which are provided on the end shoulders on the outer or inner peripheral side of the opposed end surfaces of the pin boss portions.

21 Claims, 4 Drawing Sheets

CONNECTING PIN DEVICE FOR WORKING MACHINE OPERATING LINKS

TECHNICAL FIELD

The present invention relates to a connecting pin device for working machine operating links and, in particular, to a connecting pin device for working machine operating links which is suitable for use as a connecting pin device for the machine operating links of the working unit of a hydraulic excavator or the like.

BACKGROUND ART

Figure 6:
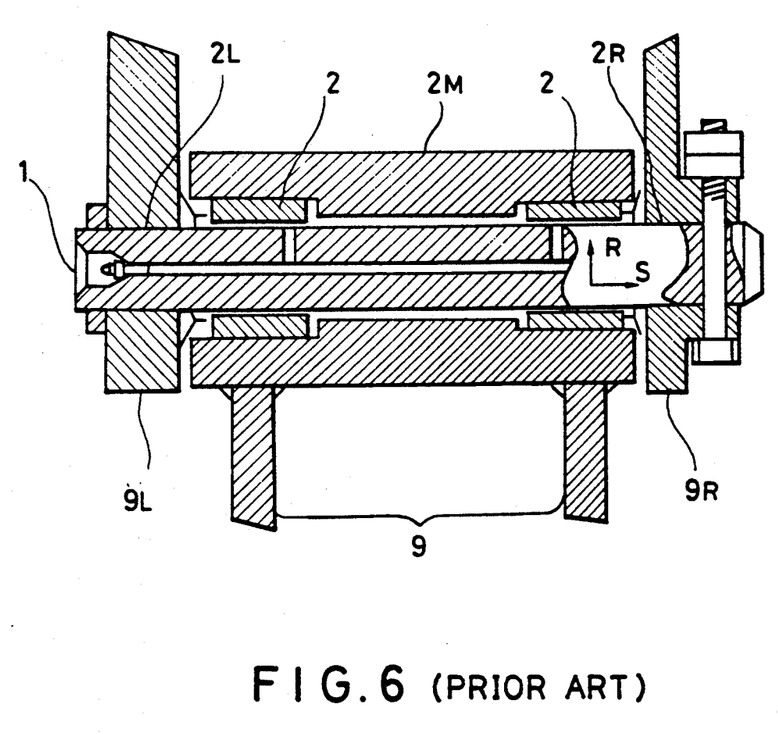
FIG. 6 is a diagram showing a conventional example of a connecting pin device for working machine operating links.

FIG. 6 shows an ordinary structure for a connecting pin device for machine operating links adapted to control the posture of a working unit. The structure of the connecting pin device for machine operating links shown in the drawing will be described below. Links 9R and 9L on one side are spaced away from and opposed to each other. Provided coaxially in end portions of these links 9R and 9L are pin boss portions 2R and 2L, into which a pin 1 is to be fitted. Disposed between these pin boss portions 2R and 2L is a cylindrical pin boss portion 2M, which is provided at one end of a link 9 on the other side, and the pin 1 is inserted into these pin boss portions 2R, 2M and 2L after mating their pin holes with each other, thus effecting pin joint connection of the links 9R, 9L and 9. This structure, however, has the following problem: To facilitate the insertion and extraction of the pin 1, the inner diameter of pin boss portions 2R and 2L and that of bushes 2, which are fitted within the pin boss portion 2M, are made larger than the outer diameter of the pin 1 (In the case, for example, of a connecting pin device for machine operating links for the working unit of a hydraulic excavator or the like, the pin 1 is inserted by "a clearance fit" with a clearance of about 1 mm or less on either side). As a result, a play (unstableness) in the radial direction R is generated in the pin connection portion. Further, to prevent the pin boss portions 2R, 2L and 2M from interfering with each other due to machining or assembly errors, etc. when placing the pin boss portion 2M between the pin boss portions 2R and 2L, the distance between the pin boss portions 2R and 2L is made larger than the width of the pin boss portion 2M. As a result, there is generated in the pin boss portion 2M a slide play (unstableness) in the axial direction S. Such a clearance or play in the joint portions causes an inertia of motion each time the movement of the machine operating links stops (for example, each time the raise movement of the working unit stops), thereby causing a rattling sound. Further, the play in the joint portions makes it impossible to suppress the inertia of motion of the working unit when the machine operating links stop moving, with the result that the shaking of the working unit cannot be stopped quickly, thus constituting an obstacle to operation. As a means for solving this problem, a structure has been proposed in which the clearance in the axial direction S is compensated for (see, for example, Japanese Utility Model Laid-Open No. 58-52315). Although it helps to avoid a play or an inertia of motion due to a play, this structure, as it is, cannot eliminate the play in the radial direction R or suppress the shaking when the machine stops its raise movement.

DISCLOSURE OF INVENTION

Figures 1, 1A, 1B:
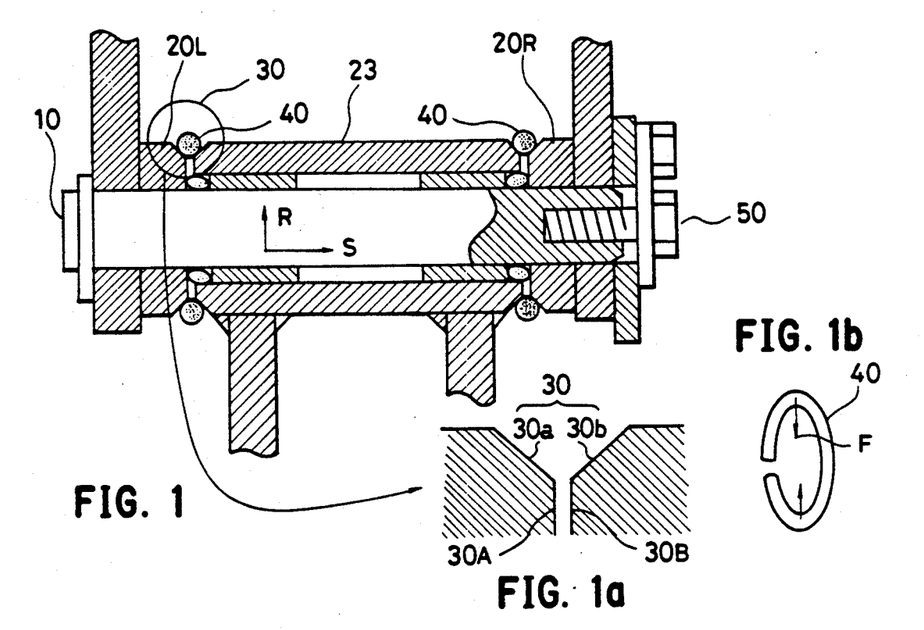
FIG. 1 is a sectional view showing the principal structure of the present invention.
FIG. 1a is a partial enlarged sectional view of a thrust distributing and forming portion.
FIG. 1b is a perspective view of a rigid-elastic annular member.

The present invention has been made in view of the above problems in the prior art. It is an object of the present invention to provide a connecting pin device for working machine operating links which is capable of minimizing the axial and radial clearance or play and suppressing an inertial movement in the rotating direction in the pin joint connection portions of machine operating links. In view of this, the present invention provides a structure as shown in FIG. 1, in which there are provided between opposed end surfaces 30A and 30B of pin boss portions 20R, 20L and 23 on one and the other side, which are rotatably connected by a pin 10, are thrust distributing and forming portions 30, which are adapted to distribute a thrust in the axial direction S and the radial direction R, and, in this structure, there are further provided rigid-elastic annular members 40, which are held by the thrust distributing and forming portions 30, and an at least one resilience imparting means 50 adapted to move the pin boss portions in the axial direction S so as to impart resilience in the radial direction R to the rigid-elastic annular members 40. When, in this structure, the pin boss portion on one side is forced to move in the axial direction S by means of the resilience imparting means 50, the thrust distributing and forming portions 30 cause the rigid-elastic annular members 40 to expand and impart a resilient force F to these rigid-elastic annular members 40, which are held by the thrust distributing and forming portions 30 that are adapted to distribute a thrust in the axial direction S and the radial direction R of the opposed end surfaces 30A and 30B of the pin boss portions 20R, 20L and 23. As a result, Q the reactive force energy of the rigid-elastic annular members 40 generates thrusts in the radial direction R and the axial direction S between the respective opposed end surfaces 30A and 30B of the pin boss portions, thereby restraining the play caused by the clearance due to the fitting relationship between the pin 10 and the pin boss portions 20R, 23 and 20L by a strong resilient reactive force $-F$ and quickly suppressing the inertial force when the machine movement stops. Further, this resilient reactive force $-F$ also imparts a rotation resistance force to the pin boss portions, thereby contributing to a reduction in the rotary inertial force when the working unit stops its raise movement.

BRIEF DESCRIPTION OF THE DRAWINGS

FIGS. 1 through 5 are diagrams showing embodiments of the connecting pin device for working machine operating links of the present invention, of which:

FIG. 2 is an external view of a machine operating link portion in the working unit of a hydraulic excavator or the like;

FIG. 4 is a sectional view of the principal structure of a third embodiment of the present invention, showing the changes in the lodging positions for the rigid-elastic annular members and the resilient force direction.

FIG. 5 show other embodiments of the present invention, of which FIG. 5a through FIG. 5f and FIG. 5f1 are sectional views showing modifications of the sectional configuration of the rigid-elastic annular member and that of the thrust distributing and forming portion holding this rigid-elastic annular member; and FIG. 5g and FIG. 5h are sectional views showing modifications in which the thrust distributing and forming portion is equipped with various types of wear prevention means.

BEST MODE FOR CARRYING OUT THE INVENTION

Figure 2:
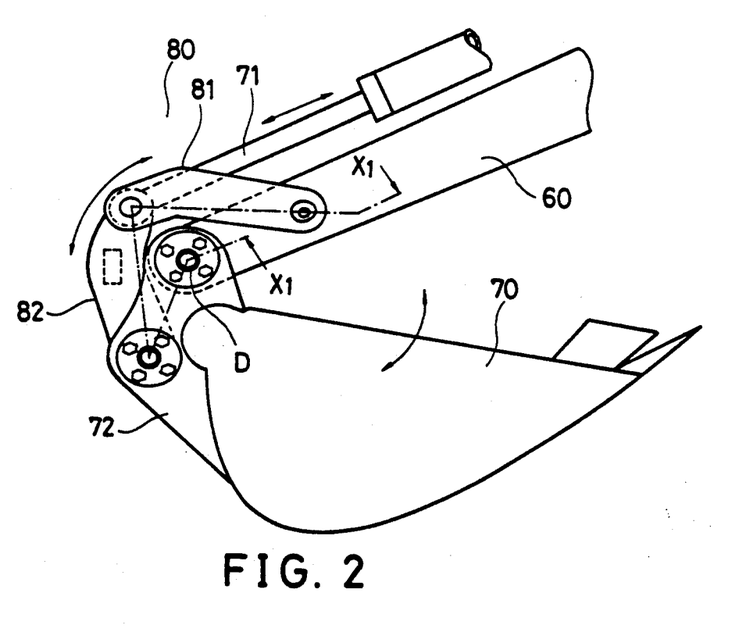
Figures 3, 3A, 3B, 3C, 3D:
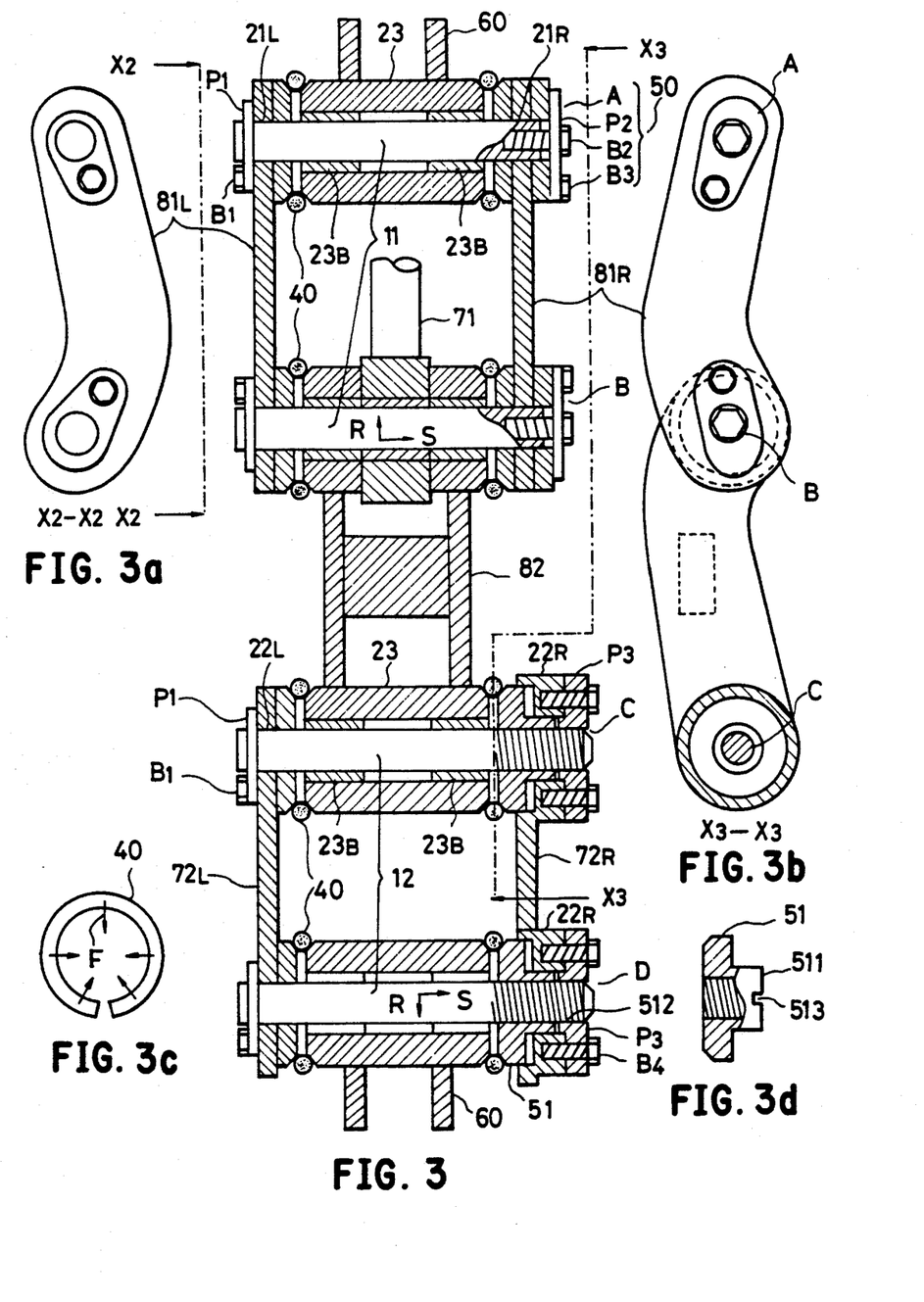
FIG. 3 is a sectional view taken along the line X1—X1 of FIG. 2, showing first and second embodiments of the present invention.
FIG. 3a is a view as seen in the direction of the arrows X2—X2 of FIG. 3.
FIG. 3b is a view, as seen in the direction of the arrows X3—X3 of the same.
FIG. 3c is a front view of a rigid-elastic annular member, which is shown in FIG. 3.
FIG. 3d is a sectional view of an axial adjustment member, which is shown in FIG. 3.
Figures 4A, 4B:
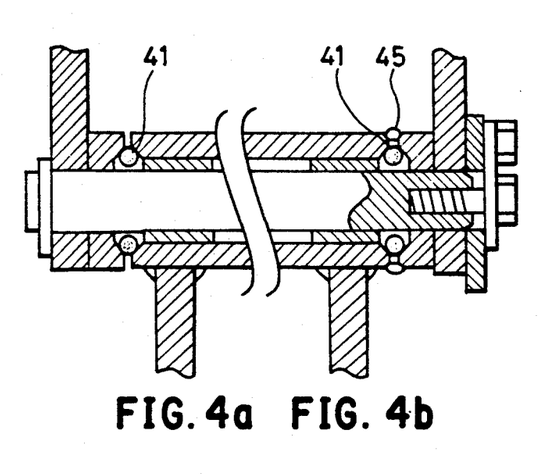
FIG. 4a shows a form of the third embodiment.
FIG. 4b shows another form of the third embodiment.
Figure 4C:
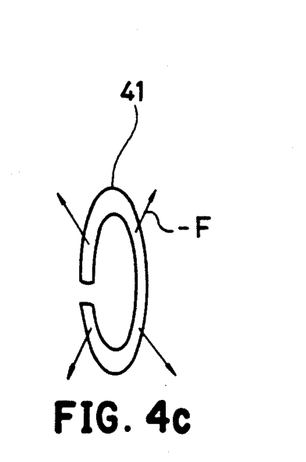
(FIG. 4c) is a perspective view of the rigid-elastic annular member used in the embodiment.
Figure 5A:
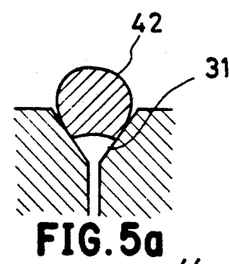
Figure 5B:
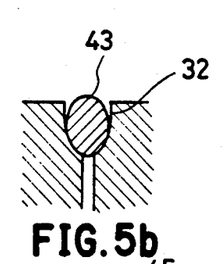
Figure 5C:
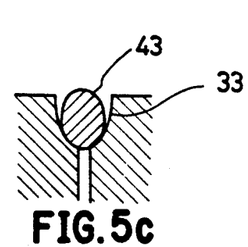
Figure 5D:
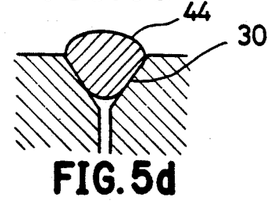
Figures 5E, 5F, 5F, 5H:
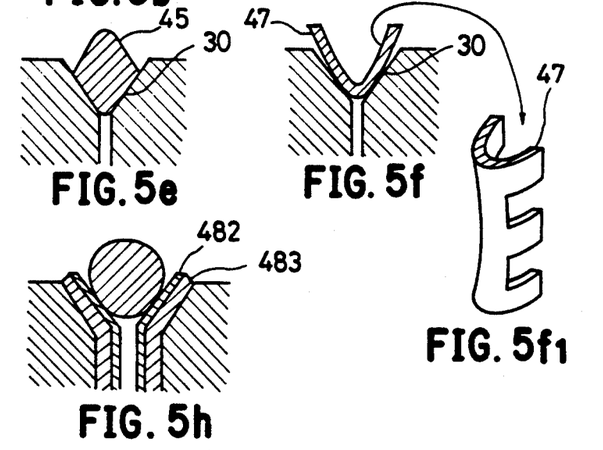
Figure 5G:
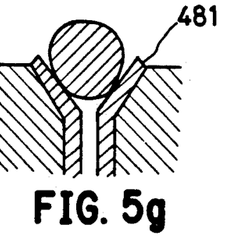

Best modes for carrying out the present invention (hereinafter referred to as "embodiments") will now be described with reference to FIGS. 2 through 5. The embodiments shown in FIGS. 2 and 3 are shown as applied to the working unit of a hydraulic excavator. Shown in FIG. 2 are a working unit lifting arm 60, a working unit (a bucket) 70, and a machine operating link device 80 including a double-acting hydraulic cylinder 71. In FIG. 2, the machine operating link device 80 consists of tilt levers 81 one end of each of which is rotatably supported by the lifting arm 60, and a tilt rod 82, one end of which is linked with these tilt levers 81 and the other end of which is connected with the linking brackets 72 of the working unit 70. The working unit 70 is rotatably connected with the front end D of the working unit lifting arm 60 and can be lifted by means of the above machine operating link device 80. More specifically, the linkage of this machine operating link device 80 is effected by the connecting pin device structure shown in FIG. 3, which is a sectional view taken along the line X1—X1 of FIG. 2. The upper section of the drawing shows two connecting pin device structures, each of which includes a pair of coaxial pin boss portions 21R and 21L, which are spaced away from each other by a fixed interval, and a pin boss portion 23 disposed between these pin boss portions 21R and 21L. Likewise, each of the two structures shown in the lower section of the drawing includes pin boss portions 22R and 22L and a pin boss portion 23 disposed therebetween. The pin boss portions 21R and 21L are respectively provided at either end of the tilt levers 81R and 81L of the machine operating link 80, and the pin boss portions 22R and 22L are respectively provided on the linking brackets 72R and 72L of the working unit 70. The pin boss portions 23 consist of cylindrical bearing members indicated by the symbols A, B, C and D, which are provided at the end portions of the working unit lifting arm 60 and the tilt rod 82. Pins 11 are inserted into the associated pin boss portions 21R, 23 and 21L to effect linkage of the machine operating link device 80, and pins 12 are inserted into the associated pin boss portions 22R, 23 and 22L to effect, likewise, linkage of the machine operating link device 80. In axial end portions of these structures, plates P1, which extend in the radial direction, are fastened to a part of the links 81L and 72L by means of bolts B1 so as to prevent these pins 11 and 12 from rotating. The pin boss portions 23 are equipped with bushes 23B, which are rotatable with respect to the pins 11 and 12. To avoid any interference due to manufacturing errors and facilitate the assembling work in the insertion of the pins 11 into the pin boss portions 21R, 23 and 21L, in the insertion of the pins 12 into the pin boss portions 22R, 23 and 22L, and in the mating and coupling of the pin boss portions (21R, 23, 21L) and (22R, 23, 22L), these components are produced by machining in such dimensions as will provide some play or clearance therebetween when they are assembled together. The pins 11 and 12 and the pin boss portions (21R, 23, 21L) and (22R, 23, 22L) are so prepared that they exhibit some play (clearance) in the axial direction S and the radial direction R when they are mated with each other. In order to restrain this play with a strong resilient force, this embodiment includes rigid-elastic annular members 40, thrust distributing and forming portions 30, and a resilience imparting means 50. As shown in FIG. 3c, each rigid-elastic member 40 has a circular configuration with a round section, with a part of its ring portion being cut off. It is formed of a rigid metal material and adapted to exert a strong reactive force with respect to traction in the radial direction R. Referring to FIG. 1 again, each rigid-elastic annular member 40 is held by one of the thrust distributing and forming portions 30 which is on the outer peripheral side of the pin boss portions adjacent thereto and defined between the opposed end surfaces 30A and 30B of these pin boss portions. Each thrust distributing and forming portion 30 is equipped with beveled surfaces 30a and 30b, which are formed on the end shoulders of the opposed end surfaces 30A and 30B on the outer peripheral side of the pin boss portions, and the rigid-elastic annular members 40 are supported by these beveled surfaces 30a and 30b. The inner ring diameter of each rigid-elastic annular member 40 is made smaller than the bottom diameter of the beveled portion. As a result, the rigid-elastic annular members 40 lodged in the thrust distributing and forming portions 30 receive a resilient restoring force F in the radial direction R, which is divided in the axial direction S and the radial direction R by the slopes of the beveled surfaces 30a and 30b. This action will be explained by referring to FIG. 3 again. The reactive force component in the axial direction S acts on the end surfaces of the pin boss portions (21R, 23, 21L) and (22R, 23, 22L) so as to suppress the axial movement of the pin boss portions 23, whereas the reactive force component in the radial direction R serves to support the pin boss portions (21R, 23, 21L) and (22R, 23, 22L) with the inner ring portions of the rigid-elastic annular members 40, resiliently retaining the clearance in the radial direction R defined by the inner diameter of the bushes 23B of the pin boss portions 23 and the outer diameter of the pins 11 and 12. Further, the rigid-elastic annular members 40, whose positions are determined by the beveled surfaces 30a and 30b of the stationary pin boss portions (21R, 23, 21L) and (22R, 23, 22L), exert an aligning action with respect to the centers of the pins 11 and 12 when the resilient retention in the radial direction of the pin boss portions is effected, thus suppressing the play in the radial direction R. Further, since they are pressed against the beveled surfaces, these rigid-elastic annular members 40 provide a frictional resistance force with respect to the relative rotating movement of the pin boss portions (21R, 23, 21L) and (22R, 23, 22L) and the pin boss portions 23. Next, to be described will be the reactive force imparting and forming portion as the means 50 for imparting resilience to the rigid-elastic annular members 40. This resilience imparting and forming portion 50 differs in the case where the stationary pin boss portions are axially movable and in the case where they are not. This embodiment covers both cases. That is, the embodiment shown in FIGS. 2 and 3 include two different embodiments. For convenience, the embodiment including the former structure will be referred to as the first embodiment, and the embodiment including the latter structure will be referred to as the second embodiment. As shown in the upper section of FIG. 3, in the case of the former structure, a plate P2 is provided at the outer end of the pin boss portion 21R. A bolt B2, which is passed through this plate P2, is screwed in the direction of the axial center of the pin 11. The right and left pin boss portions 21R and 21L are placed between the detent plate P1 on one side of the pin 11 and the plate P2 on the other side of the same, and, by the screwing of the bolt B2, the pin boss portions 21R and 21L are relatively moved in the axial direction of the pin 11. By this movement, the rigid-elastic annular members 40 on the beveled surfaces of the pin boss portions are expanded in the radial direction R, thereby obtaining a resilient reactive force $-F$. In the case of the latter structure, shown in the lower section of FIG. 3, an axial adjustment member 51, into which the pin 12 is fitted, is provided in such a manner as to be slidable towards the end surface of the pin boss portion 22R. At the same time, a movement adjusting plate P3, which has an inner protrusion 512 adapted to engage with the rear surface 511 (FIG. 3d) of the axial adjustment member 51 and into which the pin 12 is fitted, is applied to the outer end of the other pin boss portion 22R and is screwed in the axial direction by means of bolts B4 so as to effect movement adjustment, thereby causing the movement member 51 to pressurize the rigid-elastic annular members 40 and the pin boss portion 23 in the axial direction. Thus, by the action of the beveled surfaces 30a and 30b, the resilient reactive force $-F$ due to the expansion in the radial direction R of the rigid-elastic annular members 40 is obtained. The inner protrusion 512 of the movement adjustment plate P3 engages with an end surface groove 513 which is provided on the adjustment member 51, thereby preventing the adjustment member 51 from rotating. In the following, other embodiments of the present invention will be described with reference to FIGS. 4 and 5. These and other embodiments are partial modifications of the structures of the above embodiments (the first and second embodiments). In the third embodiment, the lodging positions and the resilient force direction of the rigid elastic annular members 40 are changed, as shown in FIGS. 4a and 4b. That is, each rigid-elastic annular member 40 in this case is lodged in a thrust distributing and forming portion on the inner peripheral side of the pin boss portion. In this case, the resilient force F of the rigid-elastic annular member 41 after adjustment by the resilience imparting portion 50 acts in such a manner as to expand in the direction of the outer circumference, as shown in FIG. 4c. Further, as shown in FIG. 4b, to prevent intrusion of dust into the outer peripheral gaps of the pin boss portions, excessive outflow of lubricating oil, etc., a ring seal 45 may be provided in the outer peripheral opening portion. FIGS. 5a through 5f show other embodiments, which consist of variations of the sectional configuration of the rigid-elastic annular members 40 and that of the thrust distributing and forming portions 30 holding the same. These variations include: a structure using a rigid-elastic annular member 42 with an approximately round sectional configuration and beveled working faces 31 inclined 45°, illustrated in FIG. 5a; a structure using a rigid-elastic annular member 43 having a round sectional configuration and a narrow round beveled portion 32, illustrated in FIG. 5b; a structure using a rigid-elastic annular member 43 having a round sectional configuration and a wide round beveled portion, illustrated in FIG. 5c; a structure using a rigid-elastic annular member 44 having an approximately triangular sectional configuration and beveled working faces 30 of a desired configuration, illustrated in FIG. 5d; a structure using a rigid-elastic annular member 45 having an approximately rhombic sectional configuration and beveled working faces 30 of a desired configuration, illustrated in FIG. 5e; a structure using a rigid-elastic annular member 47 having a special sectional configuration and beveled working faces 30 of a desired configuration illustrated in FIGS. 5f and 5f1, etc. In any case, these rigid-elastic annular members 40 (i.e., 40 and 41 through 47) exert a strong resilient restoring force with respect to compression or traction in the radial direction. Further, it is also possible, as in the other embodiments shown in FIGS. 5g and 5h, to provide a replaceable wear ring 481 on the beveled surfaces so as to prevent the wear of the beveled surfaces and the rigid-elastic annular members due to the frictional resistance during the relative rotating movement of the pin boss portions as illustrated in FIG. 5g. Further, it is also possible to provide a wear ring 482, a vibration absorbing ring 483, etc., in a plurality of layers, as illustrated in FIG. 5h. In accordance with the above embodiments, the connecting pin device for working machine operating links of the present invention provides the following advantages:

(1) The axial play in the pin joint connection portions is removed, thereby eliminating the rattling sound;
(2) The radial play in the pin joint connection portions is restrained by a resilient force and an aligning action, thereby making it possible to suppress the vibration due to the play so as to eliminate the rattling sound; and
(3) The peripheral rotation-stop inertia in the pin portions (which is caused by the play in the pin portions) can be suppressed quickly by frictional resistance.

Further, the above advantages (1) to (3) are particularly effective, for example, in preventing the noise, vibration, and shaking which are caused by the play in the pin joint connection portions when lifting or lowering the working unit or moving it to the right or left, or raising it in an empty-load (no-load) condition.

INDUSTRIAL APPLICABILITY

As described above, the connecting pin device for working machine operating links of the present invention is capable of minimizing the axial and radial clearance or play and suppressing the radial inertial movement in the pin joint connection portions of a machine operating link device, so that it is suitable for use as a connecting pin device for machine operating links adapted to control the posture of a working unit that is attached to the front end of the working-unit lifting arm of a hydraulic excavator or the like.

What is claimed is:

1. A joint connecting pin device for working machine operating links adapted to change and retain the posture of a working unit of a hydraulic excavator or the like, comprising: thrust distributing and forming portions which are provided between the end surfaces of pin boss portions of links on one side connected to a pin and the opposed end surfaces of a pin boss portion of a link on the other side and which are adapted to distribute a thrust in the axial and radial directions; said pin and said pin boss portions of said links on one side and said pin boss portion of said link on the other side having dimensions which provide clearance therebetween in the axial direction and in the radial direction when they are assembled together, rigid-elastic annular members which are held by said thrust distributing and forming portions while there is axial clearance between adjacent surfaces of said pin boss portions of said links on one side and said pin boss portion of said link on the other side; and an axial movement means, which is provided on at least ne of said pin boss portions, for pressurizing the rigid-elastic annular members and the pin boss portions in the axial direction to thereby expand said rigid-elastic annular members in the radial direction and for imparting a radially acting resilient force to said rigid-elastic annular members while there is axial clearance between adjacent surfaces of said pin boss portions of said links on one side and said pin boss portion of said link on the other side, whereby said rigid-elastic annular members exert a strong resilient restoring force in the radial direction to thereby suppress axial movement of the pin boss portion on said link on the other side and resiliently retain the clearance in the radial direction between the outer diameter of said pin and the inner diameter of the pin boss portion on said link on the other side.

2. A joint connecting pin device for working machine operating links according to claim 1, wherein said thrust-distributing and forming portions comprise beveled surfaces which are provided on the end shoulders of the opposed end surfaces on the outer peripheral side of said pin boss portions.

3. A joint connecting pin device for working machine operating links according to claim 1, wherein said thrust-distributing and forming portions comprise beveled surfaces which are provided on the end shoulders of the opposed end surfaces on the inner peripheral side of said pin boss portions.

4. A joint connecting pin device for a working machine operating links assembly comprising:
a link pin having first and second ends;
a pair of first and second spaced apart, generally parallel links, said first link having a first pin boss portion into which said first end of said link pin is fitted with radial clearance therebetween, said first pin boss portion having a first surface, said second link having a second pin boss portion into which said second end of said link pin is fitted with radial clearance therebetween, said second pin boss portion having a second surface facing the first surface of said first pin boss portion;
a central pin boss portion provided at one end of an additional link, said central pin boss portion having first and second end surfaces with an opening, extending from said first end surface to said second end surface, through which said link pin is fitted with radial clearance therebetween to effect linkage of said first and second links to said additional link;
said central pin boss portion being operatively positioned between said first surface of sad first pin boss portion and said second surface of second pin boss portion with said first end surface of said central pin boss portion being adjacent to said first surface of said first boss portion and with said second end surface of said central pin boss portion being adjacent to said second surface of said second boss portion, the axial length of said central pin boss portion being less than the distance between said first and second surfaces such that there is axial clearance between the first end surface of said central pin boss portion and the first surface of said first pin boss portion and axial clearance between the second end surface of said central pin boss portion and the second surface of said second pin boss portion;
the first end surface of the central pin boss portion and the first surface of said first pin boss portion having first thrust distributing and forming portions which are structured to distribute a thrust in an axial direction and in a radial direction;
a first rigid elastic annular member held by said first thrust distributing and forming portions;
the second end surface of the central pin boss portion and the second surface of said second pin boss portion having second thrust distributing and forming portions which are structured to distribute a thrust in an axial direction and in a radial direction;
a second rigid elastic annular member held by said second thrust distributing and forming portions;
means connected to said first end of said link pin and said first link for preventing said link pin from rotating with respect to said first link, and
a resilience imparting means connected to said second link and to said second end of said link pin for imparting a force to move the first pin boss portion and the second pin boss portion towards each other to pressurize the first and second rigid elastic annular members and the pin boss portions in the axial direction to thereby expand said first and second rigid elastic annular members in the radial direction to impart a radial resilient force to said first and second rigid elastic annular members while there is axial clearance between the first end surface of said central pin boss portion and the first surface of said first pin boss portion and axial clearance between the second end surface of said central pin boss portion and the second surface of said second pin boss portion, whereby said first and second rigid elastic annular members exert a strong resilient restoring force in the radial direction to thereby suppress axial movement of the central pin boss portion and resiliently retain the clearance in the radial direction between the outer diameter of said link pin and the inner diameter of said central pin boss portion.

5. A device in accordance with claim 4 wherein each of said first and second rigid elastic annular members is an incomplete annular ring formed of a rigid metal material, with the incomplete ring, due to its structure, being capable of expanding and contracting in the radial directions, said first and second rigid elastic annular members being adapted to exert a strong reactive force with respect to traction in the radial direction.

6. A device in accordance with claim 4 wherein said second end of said link pin has an internally threaded axial opening therein, and wherein said resilience imparting means comprises a plate secured to said second link, and a threaded bolt extending through said plate into said thread opening in said link pin for threaded engagement between said bolt and said link pin such that rotation of said bolt adjusts the said force.

7. A device in accordance with claim 6 wherein each of said first and second rigid elastic annular members is an incomplete annular ring formed of a rigid metal material, with the incomplete ring, due to its structure, being capable of expanding and contracting in the radial directions.

8. A device in accordance with claim 4 wherein said first thrust distributing and forming portions comprises a first replaceable wear element, and wherein said second thrust distributing and forming portions comprises a second replaceable wear element.

9. A device in accordance with claim 4 wherein said first thrust distributing and forming portions further comprises a first vibration absorbing element, and wherein said second thrust distributing and forming portions further comprises a second vibration absorbing element.

10. A device in accordance with claim 4 wherein said second end of said link pin has an externally threaded portion;
wherein said second pin boss portion comprises an opening through said second link, and an axial adjustment member slidably positioned in said opening through said second link, said axial adjustment member having an internally threaded opening therein receiving said threaded portion of said link pin in threaded engagement;
wherein said resilience imparting means comprises a movement adjusting member positioned on the outside of said second link, said resilience imparting means having an inner protrusion extending into said opening through said second link and engaging with the outer end of the axial adjustment member, and means for adjustably securing said movement adjusting member to said second link so as to effect movement adjustment in the axial direction.

11. A device in accordance with claim 10 wherein each of said first and second rigid elastic annular member is an incomplete annular ring formed of a rigid metal material, with the ring, due to its structure, being capable of expanding and contracting in the radial direction.

12. A device in accordance with claim 11 wherein said inner protrusion engages the outer end of said axial adjustment member to prevent the axial adjustment member from rotating.

13. A device in accordance with claim 11 wherein said inner protrusion of said movement adjustment member has an opening therein to receive a portion of the second end of the link pin.

14. A device in accordance with claim 10 wherein said first thrust distributing and forming portions comprises a first replaceable wear element, and wherein said second thrust distributing and forming portions comprises a second replaceable wear element.

15. A device in accordance with claim 14 wherein said first thrust distributing and forming portions further comprises a first vibration absorbing element, and wherein said second thrust distributing and forming portions further comprises a second vibration absorbing element.

16. A device in accordance with claim 4 wherein bushes are positioned between said central pin boss portion and said link pin, said bushes being rotatable with respect to said link pin.

17. A device in accordance with claim 4 wherein said first and second thrust distributing and forming portions are located on the outer peripheral side of the first, second and central pin boss portions, and wherein said first and second rigid elastic annular members are expanded radially when said resilience imparting means imparts a force to move the first pin boss portion and the second pin boss portion towards each other, thereby resulting in said first and second rigid elastic annular members imparting on inwardly directed radial resilient force to said first and second thrust distributing and forming portions.

18. A device in accordance with claim 17 wherein each of said first and second rigid elastic annular member is an incomplete annular ring formed of a rigid metal material, with the ring, due to its structure, being capable of expanding and contracting in the radial directions, and with the annular ring being formed with inner ring diameter being smaller than the bottom diameter of said first and second thrust distributing and forming portions.

19. A device in accordance with claim 4 wherein said first and second thrust distributing and forming portions are located on the inner peripheral side of the first, second and central pin boss portions, and wherein said first and second rigid elastic annular members are compressed radially when said resilience imparting means imparts a force to move the first pin boss portion and the second pin boss portion towards each other, thereby resulting in said first and second rigid elastic annular members imparting an outwardly directed radial resilient force to said first and second thrust distributing and forming portions.

20. A device in accordance with claim 19 further comprising first and second ring seals provided in the outer peripheral side of the first, second and central pin boss portions, to prevent the intrusion of dust into the gaps between the central pin boss portion and the first and second pin boss portions.

21. A joint connecting pin device for working machine operating links adapted to change and retain the posture of a working unit of a hydraulic excavator or the like, comprising: thrust distributing and forming portions which are provided between the end surfaces of pin boss portions of links on one side connected to a pin and the opposed end surfaces of a pin boss portion of a link on the other side and which are adapted to distribute a thrust in the axial and radial directions; rigid elastic annular members which are held by said thrust distributing and forming portions; and an axial movement means, which is provided on at least one of said pin boss portions and which is adapted to provide axial movement of said end surfaces of the pin boss portions of the links on one side with respect to said opposed end surfaces of a pin boss portion of a link on the other side for imparting a radially acting resilient force to said rigid elastic annular members; wherein each of said rigid elastic annular members is an incomplete annular ring formed of a rigid metal material, with the incomplete ring, due to its structure, being capable of expanding and contracting in the radial directions, said rigid elastic annular members being adapted to exert a strong reactive force with respect to traction in the radial direction.

* * * * *

UNITED STATES PATENT AND TRADEMARK OFFICE
CERTIFICATE OF CORRECTION

PATENT NO.   :   5,228,797
DATED        :   July 20, 1993
INVENTOR(S)  :   Akio OTA et al It is certified that error appears in the above-identified patent and that said Letters Patent is hereby corrected as shown below:

```
Column 7, line 17, change "ne" to --one--.

Column 7, line 66, change "sad" to --said--.

Column 9, line 45, change "direction." to
     --directions.--.

Column 9, line 51, change "adjustment" to --adjusting--.

Column 10, line 12, change "on" to --an--.

Column 10, line 55, delete the second instance of "the".
```

Signed and Sealed this

Fifth Day of April, 1994

Attest:

BRUCE LEHMAN

Attesting Officer                Commissioner of Patents and Trademarks